US012445854B2

(12) United States Patent
Newberg et al.

(10) Patent No.: US 12,445,854 B2
(45) Date of Patent: Oct. 14, 2025

(54) NETWORK ACCESS CONTROL AND OFFLOADING

(71) Applicant: Charter Communications Operating, LLC, St. Louis, MO (US)

(72) Inventors: Shane B. Newberg, Aurora, CO (US); Christopher J. Teague, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 213 days.

(21) Appl. No.: 17/529,524

(22) Filed: Nov. 18, 2021

(65) Prior Publication Data
US 2023/0156476 A1 May 18, 2023

(51) Int. Cl.
*H04W 12/72* (2021.01)
*H04W 12/08* (2021.01)
*H04W 12/37* (2021.01)
*H04W 12/40* (2021.01)
*H04W 12/73* (2021.01)

(52) U.S. Cl.
CPC .......... *H04W 12/72* (2021.01); *H04W 12/08* (2013.01); *H04W 12/37* (2021.01); *H04W 12/40* (2021.01); *H04W 12/73* (2021.01)

(58) Field of Classification Search
CPC ..... H04W 12/72; H04W 12/40; H04W 12/08; H04W 12/73
See application file for complete search history.

(56) References Cited

U.S. PATENT DOCUMENTS

| | | | | |
|---|---|---|---|---|
| 8,041,335 B2* | 10/2011 | Khetawat | ............. | H04L 63/104 |
| | | | | 455/404.1 |
| 9,479,997 B2* | 10/2016 | Scahill | ............... | H04W 12/086 |
| 9,565,558 B2* | 2/2017 | Radpour | .............. | H04W 12/08 |
| 10,484,939 B2* | 11/2019 | Wong | .................... | H04W 48/18 |
| 10,582,468 B2* | 3/2020 | Britt | ....................... | H04W 8/18 |
| 11,051,172 B2* | 6/2021 | Avula | .................... | H04W 76/14 |
| 11,388,594 B2* | 7/2022 | Uy | ........................ | H04L 9/0844 |
| 11,432,345 B1* | 8/2022 | Singh | .................... | H04W 4/021 |
| 2013/0198817 A1* | 8/2013 | Haddad | .................. | H04L 63/18 |
| | | | | 726/5 |

(Continued)

*Primary Examiner* — Viral S Lakhia
(74) *Attorney, Agent, or Firm* — Armis IP Law, LLC

(57) ABSTRACT

A network environment includes multiple wireless access points and communication management hardware. The communication management hardware controls connectivity of a mobile communication device to the first wireless access point. For example, the communication management hardware receives communications from a first wireless access point. In response to receiving the communications, the communication management hardware obtains wireless access point identity information associated with a user and/or a mobile communication device attempting to establish a wireless communication link with the wireless access point. Based on the wireless access point identity information, the communication management hardware produces a control decision associated with establishing the wireless communication link. The control decision indicates whether the first wireless access point should allow or deny establishment of the wireless communication link with the first wireless access point.

34 Claims, 10 Drawing Sheets

(56) References Cited

U.S. PATENT DOCUMENTS

| | | | |
|---|---|---|---|
| 2014/0355523 A1* | 12/2014 | Congdon | H04W 48/12 370/328 |
| 2019/0045365 A1* | 2/2019 | Gunasekara | H04W 12/12 |
| 2019/0149532 A1* | 5/2019 | Newberg | H04W 4/14 726/5 |
| 2020/0077455 A1* | 3/2020 | Manroa | H04W 76/11 |
| 2021/0112488 A1* | 4/2021 | Meredith | H04W 12/06 |
| 2022/0132315 A1* | 4/2022 | Kolekar | H04L 63/205 |
| 2022/0167300 A1* | 5/2022 | Anderson | H04W 64/00 |
| 2022/0201638 A1* | 6/2022 | Arrobo Vidal | H04W 48/18 |
| 2022/0256436 A1* | 8/2022 | Guo | H04W 40/36 |
| 2023/0232298 A1* | 7/2023 | Parichehrehteroujeni | H04W 36/00725 370/331 |

* cited by examiner

ACCOUNT
INFO.
191

XXA, XXB ......... 234567-12

XXT ................ 534567-21

XXR ................ 455612-12

XXX, XXY ......... 382212-14

XXZ ................ 288432-12

XYA ................ 277433-22

NETWORK ACCESS CONTROL AND OFFLOADING

BACKGROUND

In densely populated environments, there are typically multiple private Wi-Fi™ networks deployed to provide wireless service to multiple tenants. Normally subscribers only have the credentials to authenticate and connect to their own Wi-Fi™ network. When there is also an overlay public Wi-Fi™ network (property wide, Internet Provider, or municipality) available in addition to a subscriber's private Wi-Fi™ network, the user device operated by the subscriber may accidentally connect to the overlay public Wi-Fi™ network instead of their own private Wi-Fi™ network.

BRIEF DESCRIPTION OF EMBODIMENTS

This disclosure includes the observation that wirelessly connecting a mobile communication device to a public network when the user's private network is available to provide wireless connectivity causes user dissatisfaction, frustration and poor performance.

Embodiments herein provide novel ways of providing one or more mobile communication devices improved wireless network access, preventing unwanted wireless connectivity to wireless public networks.

More specifically, a network environment includes multiple wireless access points and communication management hardware. The communication management hardware controls connectivity of a mobile communication device to the first wireless access point. For example, the communication management hardware receives communications from a first wireless access point. In response to receiving the communications, the communication management hardware obtains wireless access point identity information associated with a user of a mobile communication device attempting to establish a wireless communication link with the wireless access point. Based on the wireless access point identity information, the communication management hardware produces a control decision associated with establishing the wireless communication link. The control decision indicates whether the first wireless access point should grant or deny establishment of the wireless communication link with the first wireless access point.

In further example embodiments, the communication management hardware communicates the control decision to the first wireless access point. The wireless access point controls establishing of the wireless communication link in accordance with the control decision.

In one circumstance, the wireless access point identity information associated with the user indicates an identity of one or more wireless access points including an identity of the first wireless access point; the first wireless access point is disposed in a subscriber domain of the user.

In another circumstance, the wireless access point identity information indicates an identity of a second wireless access point (different from the first wireless access point to which the mobile communication device is trying to connect). In one embodiment, the second wireless access point is disposed outside of the subscriber domain of the user.

In still further example embodiments, the communication management hardware obtains the wireless access point identity information via mapping of a unique identifier value assigned to the mobile communication device to the wireless access point identity information associated with the user and/or mobile communication device requesting the wireless communication link. The communication management hardware compares the retrieved unique identifier value assigned to the first wireless access point to the obtained wireless access point identity information. The communication management hardware then produces the control decision based on the comparison of the unique identifier value of the first wireless access point to the wireless access point identity information. In a similar manner as previously discussed, the communication management hardware communicates the control decision to the first wireless access point.

The control decision generated by the communication management hardware indicates denial or allowance associated with establishing the wireless communication link. For example, in one embodiment, the communication management hardware produces the control decision to deny establishing the wireless communication link in response to detecting that the wireless access point identity information matches the unique identity value assigned to and received from the first wireless access point. Alternatively, the communication management hardware produces the control decision to allow establishing the wireless communication link in response to detecting that wireless access point identity information (obtained via the mapping) is different than the unique identifier value of the first wireless access point.

The basis for retrieving the wireless access point identity information associated with the user and/or the mobile communication device may vary depending on the embodiment. For example, in one embodiment, the communication management hardware obtains the wireless access point identity information associated with the user of the mobile communication device via a unique identifier value associated with the mobile communication device and/or user. In one embodiment, the unique identifier value is non-changing assigned value stored in a SIM (Subscriber Identity Module) card of the mobile communication device.

Further embodiments herein include, via the communication management hardware, retrieving a unique identifier value (assigned to the mobile communication device and/or user) from the communications received from the first wireless access point. In response to communicating the unique identifier value to a first communication management entity (such as an information management system having access to one or more repositories as further discussed below), the communication management hardware receives an account identifier value assigned to the user of the mobile communication device. The communication management hardware communicates the account identifier value to a second communication management entity (such as an information management system having access to one or more repositories as further discussed below). In response to communicating the account identifier value to the second communication management entity, the communication management hardware receives the wireless access point identity information assigned to the user and/or mobile communication device.

In still further embodiments, in response to detecting that the first wireless access point resides outside a subscriber domain of the user, the communication management hardware determines (such as makes an inquiry about) a nearness of the first wireless access point to a second wireless access point. Assume that the second wireless access point is disposed in the subscriber domain of the user. The communication management hardware then generates the control decision to allow or deny the requested wireless communication link based on nearness of the first wireless access point to the second wireless access point.

As a more specific example, in one embodiment, the communication management hardware produces the control decision to deny establishing the wireless communication link between the mobile communication device and the first wireless access point in response to detecting that the first wireless access point is near or in a vicinity of the second wireless access point. The communication management hardware communicates the control decision (denial) to the first wireless access point.

In still further example embodiments, the communication management hardware produces the control decision to allow establishing the wireless communication link between the mobile communication device and the first wireless access point in response to detecting that the first wireless access point is not in a vicinity of or near the second wireless access point. In this latter instance, the communication management hardware also communicates the control decision to the first wireless access point, enabling the wireless communication link because it is determined that the mobile communication device is outside the region of wireless coverage provided by the second wireless access point, which is disposed in the user's subscriber domain.

Embodiments herein are useful over conventional techniques because a respective wireless communication link can be offloaded to a desired wireless network. For example, embodiments herein include granting or denying use of respective wireless services associated with a wireless access point depending upon whether the communication device is registered for use in a subscriber domain in which the wireless access point resides. Denial of allowing a mobile communication device use of guest wireless services when the user is within wireless range of the own subscriber domain and corresponding wireless access point ensures that the communication device is provided proper wireless service by the user's wireless access point instead of the public wireless connection. Conversely, granting a mobile communication device use of guest wireless services when the user is outside wireless range of the own subscriber domain and corresponding wireless access point ensures that the communication device is provided proper wireless service by the public wireless network.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to provide efficient use of wireless resources in a network environment. The instructions, when executed by computer processor hardware, cause the computer processor hardware (such as one or more co-located or disparately processor devices or hardware) to: receive communications from a first wireless access point; in response to receiving the communications, obtain wireless access point identity information associated with a user of a mobile communication device attempting to establish a wireless communication link with the wireless access point; and based on the wireless access point identity information, produce a control decision associated with establishing the wireless communication link.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a further summary as well as detailed description) and corresponding figures of the present disclosure as further discussed below.

BRIEF DESCRIPTION OF THE DRAWINGS

FIG. 3 is an example diagram illustrating account information according to embodiments herein.

Figure 1:
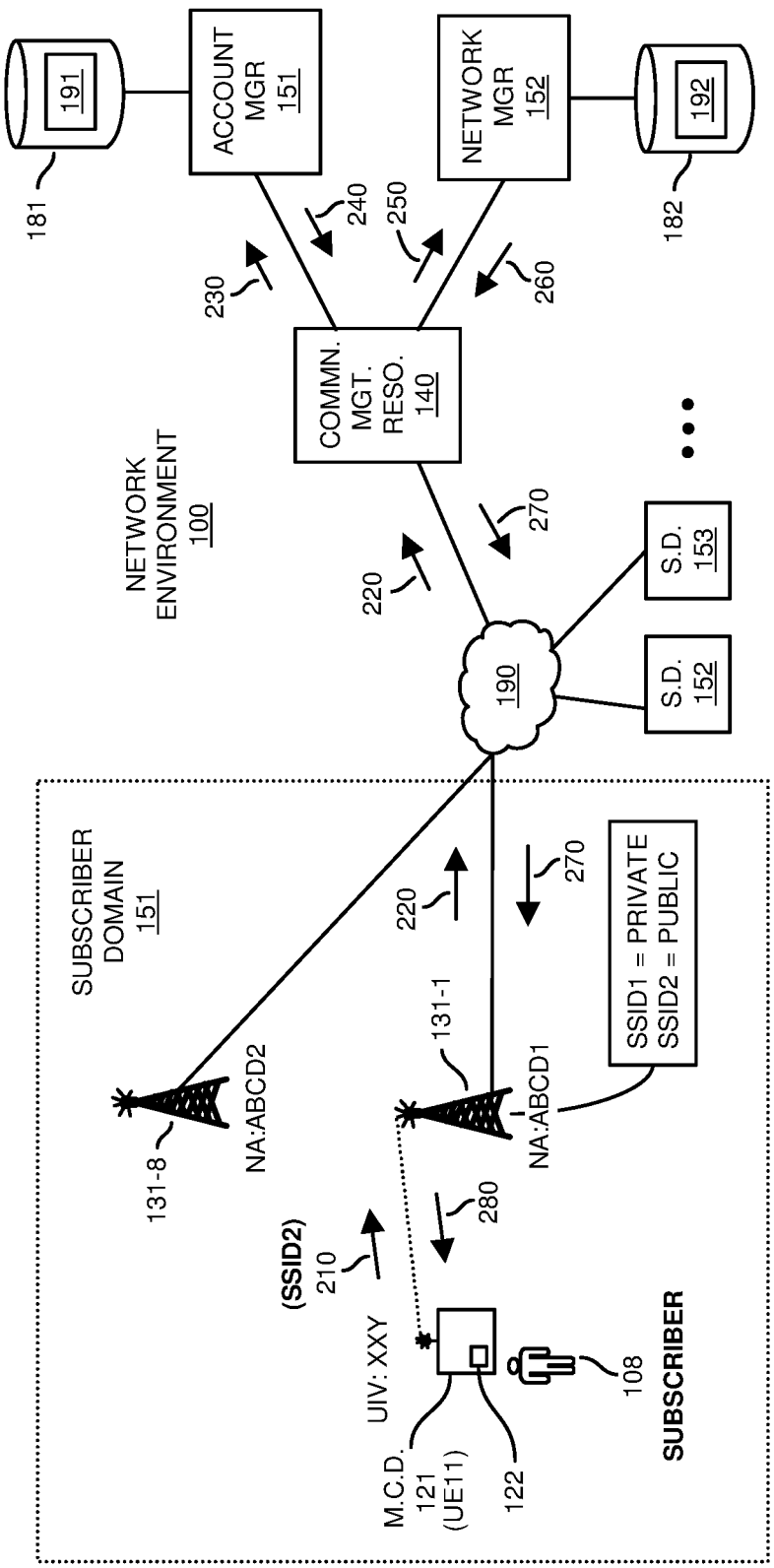
FIG. 1 is an example diagram illustrating a communication system implementing access control according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to embodiments herein, a network environment includes multiple wireless access points and communication management hardware providing wireless access control to one or more mobile communication devices. For example, the communication management hardware receives communications from a first wireless access point. In response to receiving the communications, the communication management hardware obtains wireless access point identity information associated with a user of a mobile communication device attempting to establish a wireless communication link with the wireless access point. In one embodiment, the wireless access point indicates an identity of a wireless access point in the user's subscriber domain. Based on the wireless access point identity information associated with the user and/or mobile communication device, the communication management hardware produces a control decision associated with establishing the wireless communication link. The control decision indicates whether the first wireless access point should allow or deny establishment of the wireless communication link with the first wireless access point.

Embodiments herein include deploying multiple managed wireless access points (such as Wi-Fi™ routers or other suitable entities) into densely populated areas such as MDU (Multi-Dwelling Unit) environments. It is desirable that subscribers use the managed wireless access points (of a given service provider) rather than partner wireless access points (associated with partner service providers) to access a respective remote network such as the Internet. To provide maximum offload of the subscribers to a corresponding service provider's network of wireless access points, embodiments herein include broadcasting an overlay SSID in large quantities and in as many areas as possible from multiple wireless access points of the given service provider. The given service provider also desires to provide the subscribers private use of the network of wireless access points.

For example, when a subscriber is in their own home (subscriber domain), it is preferable for the subscriber to connect to their own wireless access point and private network using their own private SSID instead of the overlay public SSID available for users outside of their subscriber domain (such as home environment).

In one embodiment, as further discussed herein, each of the wireless access points in the given service provider's network can be configured to scan presence of other nearby wireless access points. Each wireless access point reports neighbor information of nearby wireless access points to a communication management resource. When a communication device attempts to connect to the overlay Wi-Fi™ network, the communication management resource determines whether the user's private network is available to provide wireless connectivity rather than the ubiquitous public network available from many different wireless access points. In such an instance, when a respective user operates their communication device within wireless range of their own private wireless network supported by the wireless access point in their subscriber domain, the requested connection is denied. This forces the mobile communication device to connect to their own wireless access point and corresponding private network SSID rather than a guest SSID on their wireless access point or a neighbor's wireless access point.

Now, more specifically, with reference to the drawings, FIG. 1 is an example diagram illustrating a communication system implementing access control according to embodiments herein.

As shown, wireless network environment 100 includes multiple subscriber domains including subscriber domain 151, subscriber domain 152, subscriber domain 153, etc. Network environment further includes network 190, communication management resource 140, account manager 151, network manager 152, repository 181, repository 182, etc. Repository 181 stores account information 191; repository 182 stores network information 192.

As further shown, the subscriber domain 151 includes a respective wireless access point 131-1 supporting any suitable wireless communication protocol. In one non-limiting example embodiment, the wireless access point 131-1 supports Wi-Fi™ communications via multiple different available SSIDs (such as SSID1, SSID2, etc.). Subscriber domain 151 also includes a respective wireless access point 131-8 supporting any suitable wireless communication protocol. In one non-limiting example embodiment, the wireless access point 131-8 supports Wi-Fi™ communications via multiple different available SSIDs (such as SSID1, SSID2, etc.).

Note that each of the resources as discussed herein can be configured to operate as hardware, executed software, or a combination of hardware and software.

More specifically, the communication management resource 140 as discussed herein can be implemented as communication management hardware, communication management software, or a combination of communication management hardware and communication management software; each instance of user equipment (mobile communication device) can be implemented as mobile communication device hardware, mobile communication device software, or a combination of mobile communication device hardware and mobile communication device software; account manager 151 can be implemented as account manager hardware, account manager software, or a combination of account manager hardware and account manager software; network manager 152 can be implemented as network manager hardware, network management software, or a combination of network management hardware and network management software; and so on.

In further example embodiments, the SSID1 associated with the wireless access point 131-1 provides a first level of wireless service; the SSID2 associated with the wireless access point 131-1 provides a second level of wireless service. Wireless access point 131-8 can be configured to support a public (such as SSID2) and private network (such as SSID1), similar to wireless access point 131-1.

In still further example embodiments, the first level of wireless service (private service) provides better wireless connectivity (such as higher bit rate of conveying data, lower latency of conveying data, etc.) than the second level of wireless service (public service. Accordingly, it is preferable to the user 108 that the mobile communication device 121 (also known as UE11) wirelessly connect to the wireless access point 131-1 via the SSID1 instead of SSID2 when requesting wireless connectivity.

However, note that the mobile communication device 121 may be susceptible to connecting to any available network such as the guest wireless network provided by the SSID2. As further discussed herein, implementation of the communication management resource 140 (such as authentication manager) in conjunction with the wireless access point 131-1 provides a way to deny the mobile communication device 121 access to the wireless access point 131-1 via the guest network via SSID2 when desired, forcing the mobile communication device 121 to connect to the proper private network instead via SSID1.

Denial of services as discussed herein ensures that the user 108 and corresponding mobile communication device 121 are provided the best wireless network connectivity possible because they are forced to use the private network associated with SSID1.

Note that each of the subscriber domains can be configured in a similar manner as subscriber domain 151. For example, each of the subscriber domains in network environment 100 can be assigned a respective private SSID value as well as a public (guest) SSID value. A guest can use any of the public SSID values associated with any of the wireless access points in the subscriber domains whereas the private SSID values are available for use only by equipment registered in that subscriber domain. Thus, the guest wireless access services are available anywhere in the network environment 100 for any of the users associated with a service provider providing the wireless access capability via the respective wireless access points 131. Private wireless services are limited to a respective user's subscriber domain.

Assume in this example embodiment that the user 108 operates the mobile communication device 121 to access the wireless access point 131-1 and corresponding remote network 190 via use of SSID2 (public network). As previously discussed, it is undesirable that the mobile communication device 121 use the guest network associated with SSID2 given that the higher performance private network is available via use of SSID1. The hardware and/or software associated with the mobile communication device 121 may not be programmed to always use the SSID1 when present in the subscriber domain 151. A specific example of communication flow amongst the multiple entities in network environment 100 to force the mobile communication device 121 to connect to the wireless access point 131-1 via the SSID1 is further shown with reference to FIG. 2.

Figure 2:
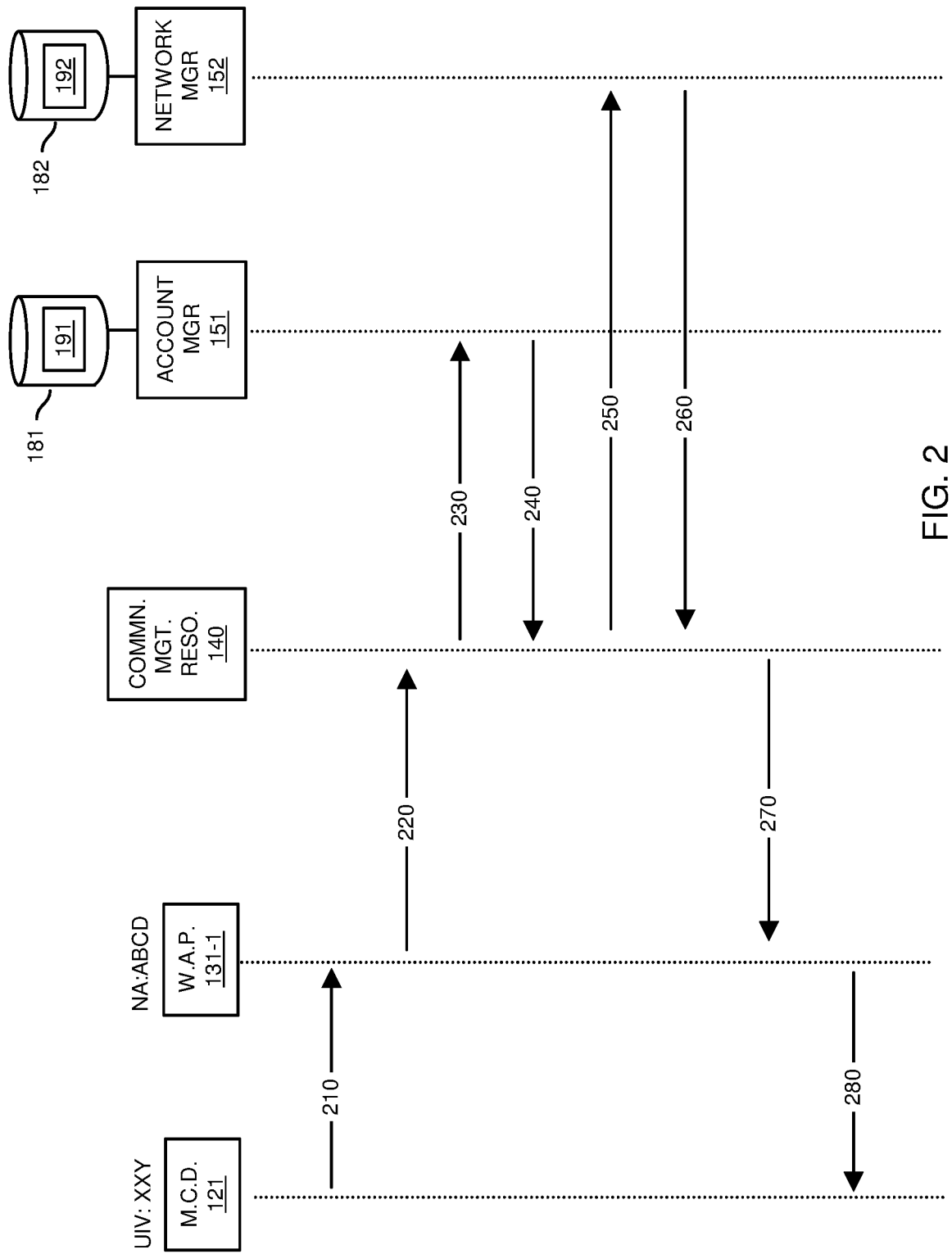
FIG. 2 is an example diagram illustrating communication flow amongst multiple entities according to embodiments herein.

FIG. 2 is an example diagram illustrating communication flow amongst multiple entities according to embodiments herein. Note that the following discussion will reference both FIGS. 1 and 2 (as well as FIGS. 3 and 4) to illustrate wireless access control.

As shown, assume that the user 108 (such as a subscriber paying fees for use of the wireless access point 131-1 in his/her subscriber domain 151) would like to establish a respective wireless communication link with wireless access point 131-1 in order to connect to a remote network 190 such as the Internet, mobile network, etc. In such an instance, the mobile communication device 121 transmits communications 210 over a respective wireless link to the wireless access point 131-1 to establish a respective wireless communication link with the wireless access point 131-1.

Note that the communications 210 can include any suitable information. For example, in this example embodiment, the communications 210 indicate that the mobile communication device 121 would like to establish a respective wireless communication link with the wireless access point 131-1 via use of the guest network (public) network associated with the SSID2. In one embodiment, the communications 210 include the identity of the guest network via inclusion of SSID2 in the request message associated with communications 210. In other words, the communications 210 specify SSDI2 indicating that the mobile communication device 121 would like to connect to the guest network of wireless access point 131-1. Additionally, the communications 210 such as a wireless link request message include the unique identifier value XXY assigned to the mobile communication device 121.

Note further that the unique identifier value assigned to the mobile communication device 121 can be any suitable value. In one embodiment, the mobile communication device 121 includes configuration information 122 such as SIM (Subscriber Identity Module) or other suitable information. In one embodiment, the configuration information 122 includes a static, permanent, or non-changing unique identifier value (UIV) XXY assigned to the mobile communication device 121. In further nonlimiting example embodiments, the non-changing unique identifier value XXY is a so-called IMSI (International Mobile Subscriber Identity) value or other suitable value. In contrast to an assigned network address that may change over time, the nonchanging unique identifier value such as IMSI or other suitable value does not change over time and is therefore a reliable indicator of an identity of the mobile communication device 121.

In response to receiving the communications 210, the wireless access point 131-1 transmits communications 220 to the communication management resource 140 (such as authentication manager). The communication management resource 140 determines whether or not to provide the mobile communication device 121 access to the wireless access point 131-1 using the requested network as specified by SSID2. In one embodiment, the communications 220 include information such as the unique network address ABCD (such as called station ID or MAC address) assigned to the wireless access point 131-1 and unique identifier value XXY assigned to the mobile communication device 121 requesting the wireless connectivity over the guest wireless network via SSID2.

In order to determine whether or not the wireless access point 131-1 should provide wireless connectivity to the mobile communication device 121 via the guest network based on SSID2, the communication management resource 140 transmits communications 230 to the account manager 151. In one embodiment, the communications 230 include the nonchanging (static) unique identifier value XXY assigned to the mobile communication device 121. The account manager 151 performs a respective look up in the account information 191 to identify a respective account number assigned to the user 108 (such as subscriber associated with subscriber domain 151) operating the mobile communication device 121.

Note that FIG. 3 is an example diagram illustrating account information according to embodiments herein. As shown in FIG. 3, and corresponding account information 191, the unique identifier value XXY associated with the mobile communication device 121 maps to the account information 382212-14.

Referring again to FIG. 2, in response to the account manager 151 mapping the unique identifier value XXY to the account value 382212-14, the account manager 151 transmits the response communications 240 including the account value 382212-14 to the communication management resource 140 as a response to the query communications 230.

As further shown, the communication management resource 140 then transmits communications 250 to the network manager 152. In one embodiment, the communications 250 include the obtained account information 382212-14 assigned to the subscriber domain 151, user 108, and/or mobile communication device 121.

The network manager 152 uses the account information 382212-14 associated with the mobile communication device 121 to determine a corresponding identity of each wireless access point operated in the subscriber domain 151.

Figure 4:
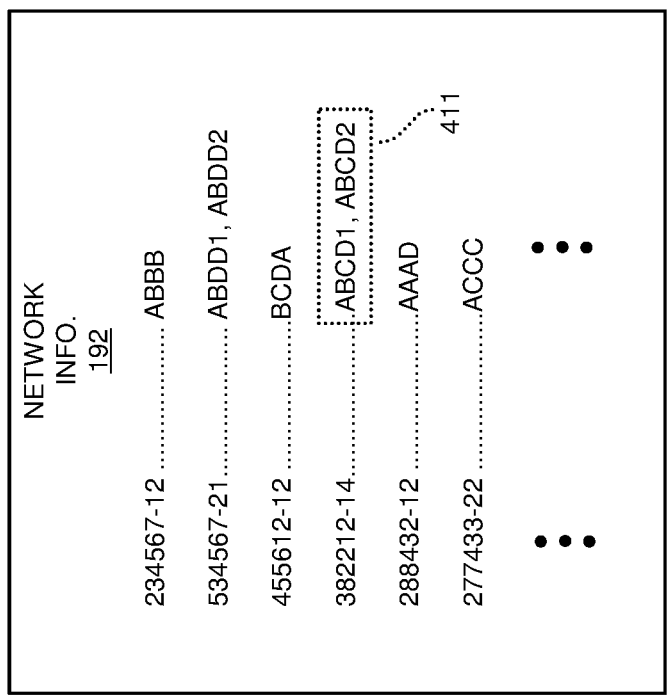
FIG. 4 is an example diagram illustrating network information according to embodiments herein.

An example of the network information 192 is shown in FIG. 4. In the example embodiment of FIG. 4, the network manager 152 maps the account information 382212-14 to the wireless access point identity information 411 including network address ABCD1 (such as a unique network address assigned to the wireless access point 131-1 disposed in the subscriber domain 151), network address ABCD2 (such as a unique network address assigned to the wireless access point 131-8 disposed in the subscriber domain 151). In other words, the wireless access point identity information 411 indicates that wireless access point 131-1 assigned network address ABCD1 resides in the subscriber domain 151. The wireless access point identity information 411 also indicates that wireless access point 131-8 assigned network address ABCD2 resides in the subscriber domain 151.

Referring again to FIG. 2, the network manager 152 transmits communications 260 to the communication management resource 140. The communications 260 include the wireless access point identity information 411. Accordingly, the communication management resource 140 receives notification of respective one or more wireless access points disposed in the subscriber domain 151 of the user 108.

The communication management resource 140 then compares the identity (such as network address ABCD1) associated with wireless access point 131-1 as received in the communications 220 to the wireless access point identity information 411 received from the network manager 152. Because the network address ABCD1 as received from the wireless access point 131-1 in communications 220 matches a wireless access point identity of ABCD1 present in the wireless access point identity information 411 received from the network manager 152 (i.e., the wireless access point identity information 411 includes network address ABCD1), the communication management resource 140 produces communications 270 indicating that the wireless access point 131-1 should not provide the mobile communication device 121 wireless connectivity via the guest network SSID2. In other words, because it is known that the mobile communication device 121 is trying to connect to wireless access point 131-1 via the guest network identified by SSID2, and that the wireless access point 131-1 resides in the subscriber domain 151 to provide service to the mobile communication device 121, the communication management resource 140 notifies the wireless access point 131-1 to deny the request by the mobile communication device 121 to use the guest network.

Via communications 280 transmitted from the wireless access point 131-1 to the mobile communication device 121, the wireless access point 131-1 notifies the mobile communication device 121 that the requested wireless service over the guest network via SSID2 has been denied.

Thus, the communication management resource 140 communicates a control decision (via communications 270) to the first wireless access point 131-1. The wireless access point 131-1 then controls establishing of the wireless communication link with the mobile communication device 121 in accordance with the control decision. For example, in one embodiment, the wireless service denial decision forces the mobile communication device 121 to attempt wireless connectivity to the wireless access point 131-1 via the use of the private network associated with the wireless access point 131-1 as specified by the SSID1.

Accordingly, embodiments herein include the communication management resource 140: receiving communications 220 from the wireless access point 131-1; in response to receiving the communications 220, obtaining wireless access point identity information 411 (such as including wireless access point identity information ABCD1) associated with a user and/or the mobile communication device 121 attempting to establish the wireless communication link with the wireless access point 131-1; and based on the obtained wireless access point identity information 411 from the network management 152, produce a control decision (denial) associated with establishing the requested wireless communication link.

Figure 5:
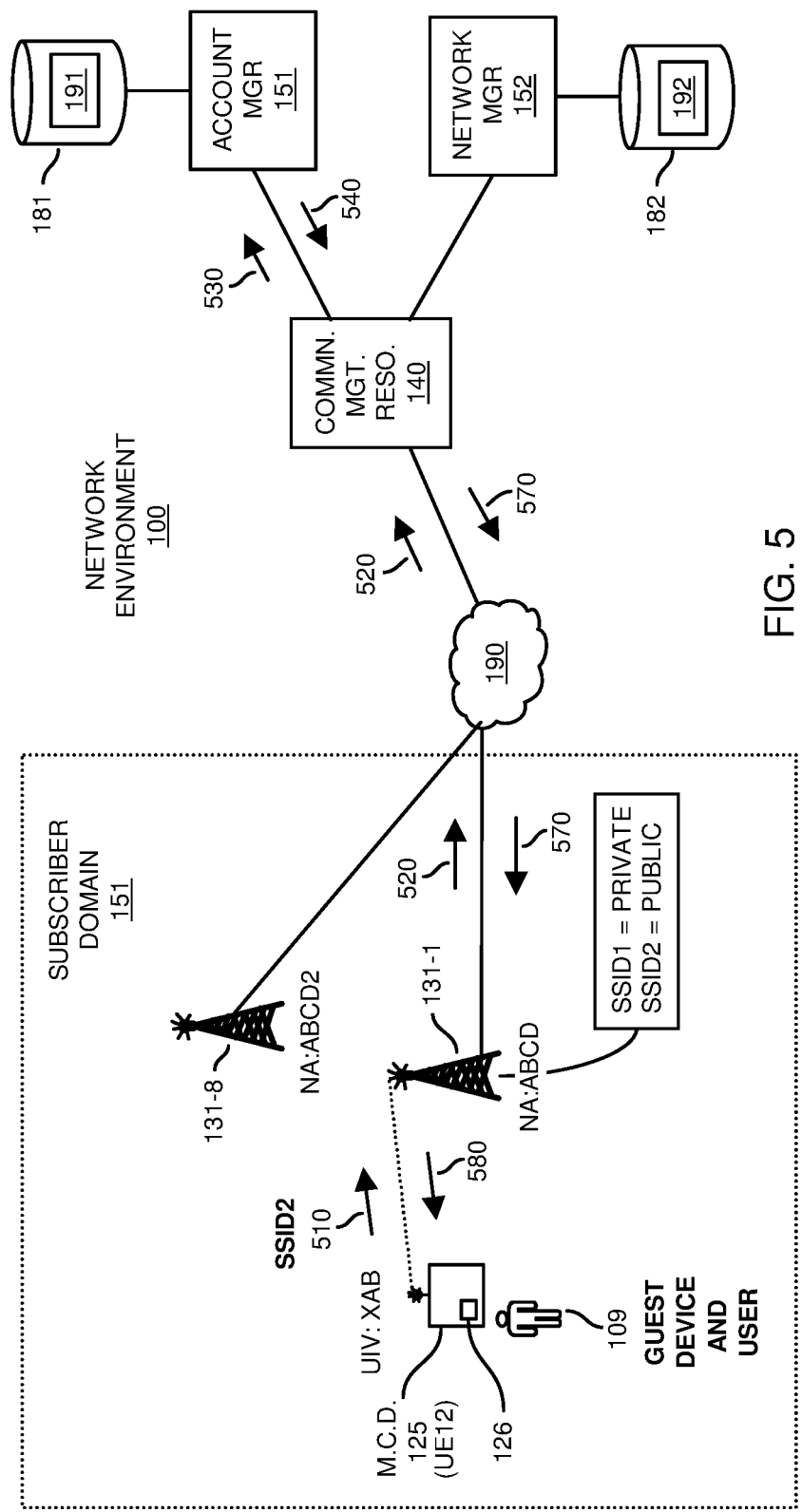
FIG. 5 is an example diagram illustrating network access control associated with a guest device according to embodiments herein.

As further shown and discussed herein in FIG. 5, the communication management resource 140 can be configured to produce a control decision to allow establishing of a requested wireless communication link in response to detecting that a respective mobile communication device is not trying to connect to its own wireless access point. In other words, if the mobile communication device attempting to use the wireless access point 131-1 or 131-8 in subscriber domain 151 is a guest device, then that guest mobile communication device is allowed to use the public SSID2 network without being denied use.

FIG. 5 is an example diagram illustrating network access control associated with a guest device according to embodiments herein.

In this example embodiment, the user 109 such as a guest user operates the mobile communication device 125 (such as UE12) in the subscriber domain 151. As indicated by the configuration information 126, the mobile communication device 125 is assigned a unique identifier value (such as non-changing or permanent identity) of XAB. In one embodiment, the value XAB is an IMSI value or phone number assigned to the mobile communication device 125.

As shown, assume that the user 109 (such as a guest that is not a subscriber paying fees for use of the wireless access point 131-1 in the subscriber domain 151) would like to establish a respective wireless communication link with wireless access point 131-1 in order to connect to a remote network 190 such as the Internet, mobile network, etc. In such an instance, the mobile communication device 125 transmits communications 510 over a respective wireless link to the wireless access point 131-1 to establish a respective wireless communication link with the wireless access point 131-1.

Note that the communications 510 can include any suitable information. For example, in one embodiment, the communications 510 indicate that the mobile communication device 125 would like to establish a respective wireless communication link with the wireless access point 131-1 via use of the guest network (public) network associated with the SSID2. In one embodiment, the communications 210 can include the identity of the guest network via inclusion of SSID2 in the request message associated with communications 510. Additionally, the communications 510 such as a wireless link request message include the unique identifier value XAB assigned to the mobile communication device 125.

Note further that the unique identifier value XAB assigned to the mobile communication device 125 can be any suitable value. In one embodiment, the mobile communication device 125 includes configuration information 126 such as SIM (Subscriber Identity Module) or other suitable information. The configuration information 126 includes a static, permanent, or non-changing unique identifier value (UIV) XAB assigned to the mobile communication device 126.

In one nonlimiting example embodiment, the non-changing unique identifier value XAB is a so-called IMSI (International Mobile Subscriber Identity) value such as a phone number or other suitable value. In contrast to an assigned network address that may change over time, the nonchanging unique identifier value such as IMSI or other suitable value does not change over time and is therefore a reliable indicator of an identity of the mobile communication device 125.

In response to receiving the communications 510, the wireless access point 131-1 transmits communications 520 to the communication management resource 140 such as authentication manager function. The communication management resource 140 determines whether or not to provide the mobile communication device 125 access to the wireless access point 131-1 using the public network as specified by SSID2. In one embodiment, the communications 520 include information such as the unique network address ABCD1 (such as called station ID or MAC address) assigned to the wireless access point 131-1 and unique identifier value XAB assigned to the mobile communication device 125 requesting the wireless connectivity over the guest wireless network via SSID2.

In order to determine whether or not the wireless access point 131-1 should provide wireless connectivity to the mobile communication device 125 via the guest network based on SSID2, the communication management resource 140 transmits communications 530 to the account manager 151. In one embodiment, the communications 530 include the nonchanging unique identifier value XAB assigned to the mobile communication device 125. The account manager 151 performs a respective look up in the account information 191 to identify a respective account number assigned to the user 109 and/or mobile communication device 121.

As previously discussed, FIG. 3 is an example diagram illustrating account information according to embodiments herein. As shown in FIG. 3, and corresponding account information 191, the unique identifier value XAB associated with the mobile communication device 125 does not map to any account information.

Referring again to FIG. 5, in response to the account manager 151 not being able to map the unique identifier value XAB to an account value associated with the given service provider, the account manager 151 transmits the response communications 540 to the communication management resource 140 as a response to the query communications 530. The communications 540 indicate that the mobile communication device 125 and/or corresponding user 109 are not known to be associated with the subscriber domain 151.

Because the user 109 is determined to be a guest and the corresponding mobile communication device 125 is determined to be a guest device (based on the inability to map the value XAB to the subscriber domain 151), via communications 570, the communication management resource 140 provides notification to the wireless access point 131-1 to provide the mobile communication device 125 wireless connectivity via the guest network SSID2. In other words, because it is known that the mobile communication device 125 is a guest device not associated with the subscriber domain 151, the communication management resource 140 notifies the wireless access point 131-1 to grant the request by the mobile communication device 125 to use the guest network as specified by the network identifier SSID2.

Via communications 580 transmitted from the wireless access point 131-1 to the mobile communication device 125, the wireless access point 131-1 notifies the mobile communication device 125 that the requested wireless service over the guest network via SSID2 has been granted. Thus, the communication management resource 140 communicates a control decision (via communications 570) to the wireless access point 131-1. The wireless access point 131-1 then controls establishing of the wireless communication link with the mobile communication device 125 in accordance with the control decision indicating to grant the requested wireless services.

Thus, in this example embodiment, there is no denial of service causing a respective mobile communication device to try another SSID value because the mobile communication device 125 is provided guest wireless services by the wireless access point 131-1.

Figure 6:
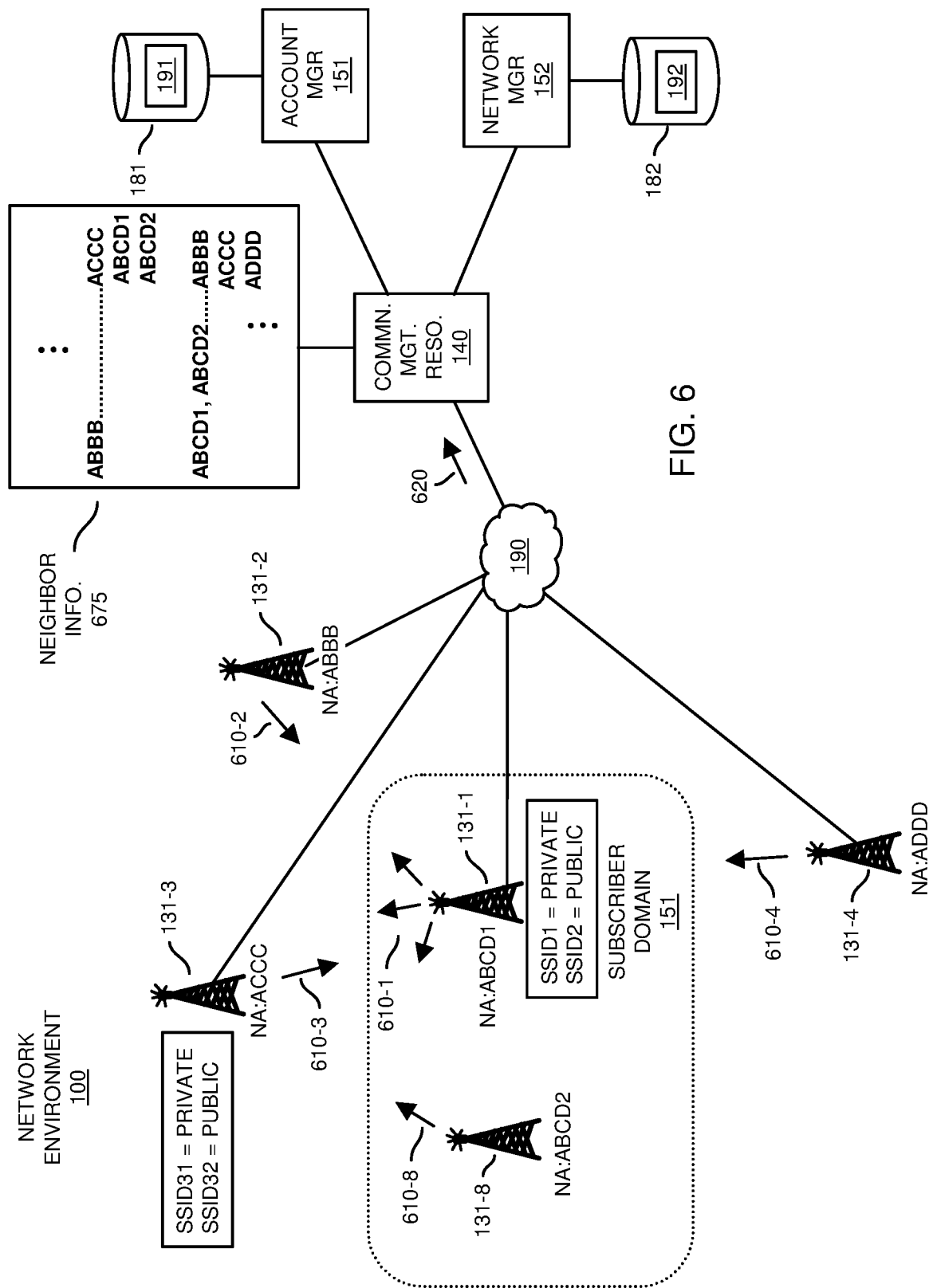
FIG. 6 is an example diagram illustrating discovery of nearby wireless access point according to embodiments herein.

FIG. 6 is an example diagram illustrating discovery of nearby wireless access points according to embodiments herein.

In this example embodiment, each of the wireless access points 131 broadcasts discovery information indicating their presence in the network environment 100. For example, wireless access point 131-1 broadcasts wireless communications 610-1 indicating its identity ABCD1 to the other wireless access points 131-2, 131-3, 131-4, etc.; wireless access point 131-2 broadcasts wireless communications 610-2 indicating its identity ABBB to the other wireless access points 131-1, 131-3, 131-4, etc.; wireless access point 131-3 broadcasts wireless communications 610-3 indicating its identity ACCC to the other wireless access points 131-1, 131-2, 131-4, etc.; wireless access point 131-4 broadcasts wireless communications 610-4 indicating its identity ADDD to the other wireless access points 131-1, 131-2, 131-3, etc.; wireless access point 131-8 broadcasts wireless communications 610-8 indicating its identity ABCD2 to the other wireless access points 131-1, 131-2, 131-3, 131-4, etc.

Each of the wireless access points receives respective broadcast communications if they are within range of a respective broadcasting wireless access point. For example, the wireless access point 131-1 receives wireless communications 610-2, 610-3, 610-4, etc. In such an instance, based on identity information in each of the received wireless communications 610-2, 610-3, 610-4, etc., and detecting respective wireless power levels being above threshold level at which such communications are received, the wireless access point 131-1 determines that wireless access points 131-2, 131-3, 131-4 are nearby and within wireless range of the wireless access point 131-1.

The wireless access point 131-8 receives wireless communications 610-2, 610-3, 610-4, etc. In such an instance, based on identity information in each of the received wireless communications 610-2, 610-3, 610-4, etc., and detecting respective wireless power levels being above threshold level at which such communications are received, the wireless access point 131-8 determines that wireless access points 131-2, 131-3, 131-4 are nearby and within wireless range of the wireless access point 131-8.

The wireless access point 131-1 then communicates the detected neighbor information obtained during discovery to the communication management resource 140. The communication management resource 140 then stores the received detected neighbor information as neighbor information 675. In a similar manner, each of the wireless access point communicates respective neighbor discovery information to the communication management resource 140.

As shown, the neighbor information 675 indicates that the neighbor information 675 indicates that the wireless access point 131-2 assigned network address ABBB is disposed in close proximity to the wireless access point 131-3 (ACCC), wireless access point 131-1 (ABCD1), and wireless access point 131-8 (ABCD2).

The neighbor information 675 further indicates that multiple wireless access points including wireless access point 131-2 (ABBB), wireless access point 131-3 (ACCC), and wireless access point 131-4 (ADDD) are disposed in close proximity to both wireless access points 131-1 (ABCD1) and 131-8 (ABCD2). In one embodiment, the neighbor information 675 indicates nearby wireless access points with respect to each other that support wireless reception of signals above a wireless power threshold level. In other words, in one embodiment, the wireless access point 131-1 is deemed to be nearby with respect to wireless access points 131-2, 131-3, and 131-4 as indicated by the neighbor information 675 because the wireless access point 131-1 receives wireless communications (610-2, 610-3, 610-4) from the wireless access points above a wireless threshold level. Additionally, or alternatively, the wireless access point 131-1 is deemed to be nearby with respect to wireless access points 131-2, 131-3, and 131-4 as indicated by the neighbor information 675 because the wireless access points 131-2, 131-3, 131-4 each receive wireless communications (610-1) from the wireless access point 131-1 above a wireless threshold level.

In a similar manner, each of the wireless access points forward the discovered wireless access point neighbor information to the communication management resource 140. Via the neighbor information 675, the communication management resource 140 keeps track of which of one or more wireless access points are near in proximity to a respective wireless access point in the network environment 100.

As further discussed below, the neighbor information 675 is used as a basis to control wireless access.

Figure 7:
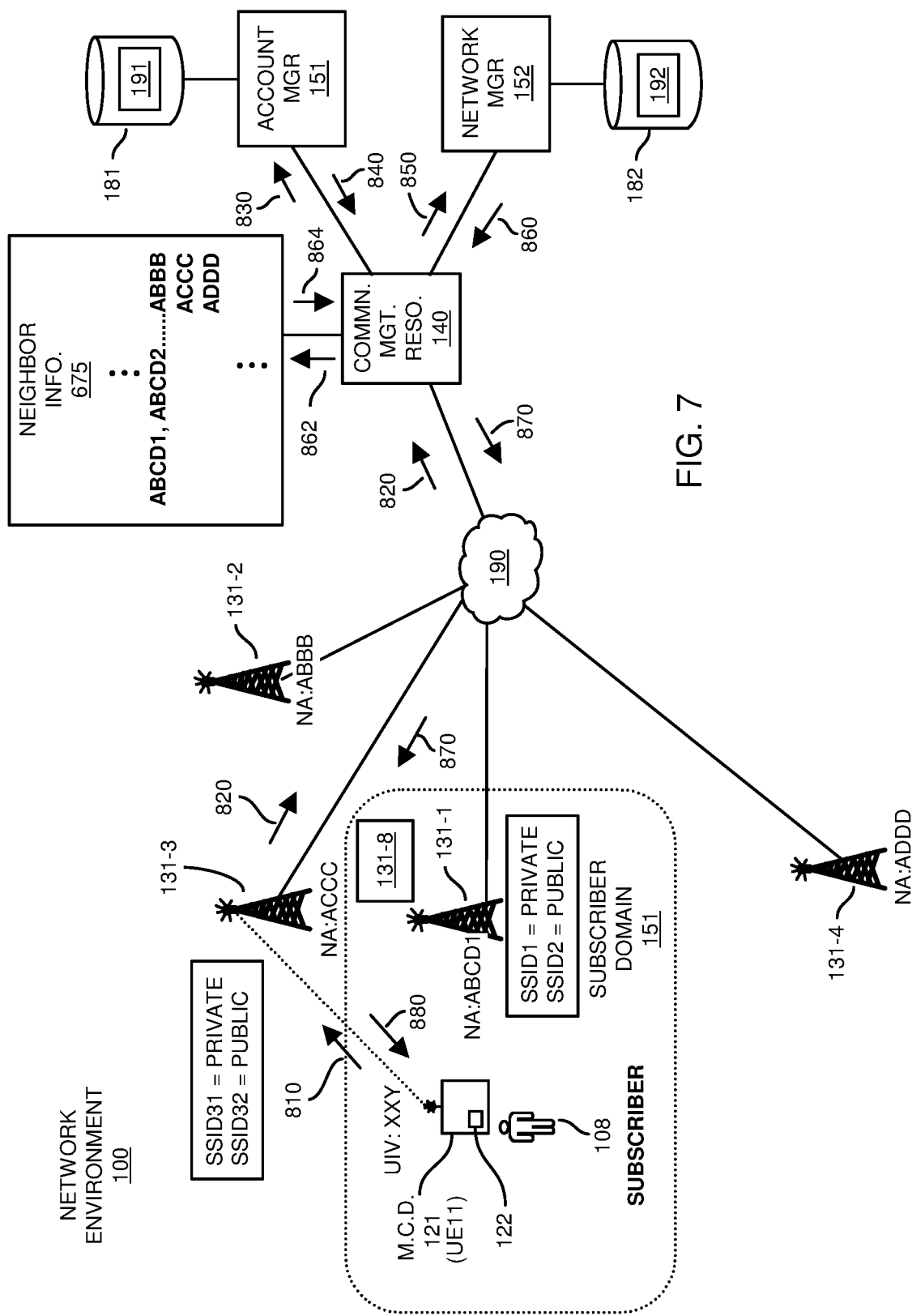
FIG. 7 is an example diagram illustrating access control according to embodiments herein.
Figure 8:
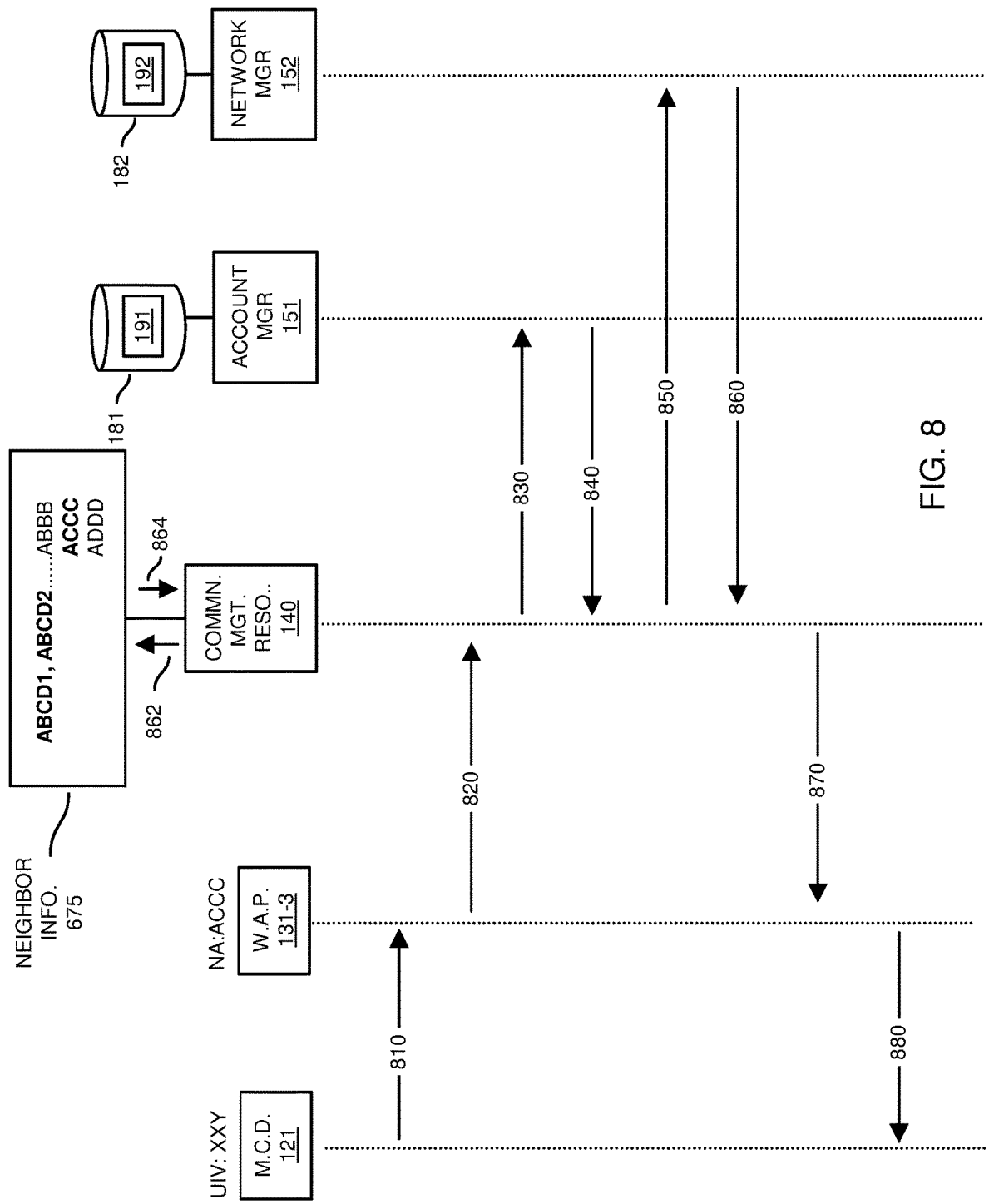
FIG. 8 is an example diagram illustrating communication flow and access control according to embodiments herein.

FIG. 7 is an example diagram illustrating access control according to embodiments herein. FIG. 8 is an example diagram illustrating communication flow according to embodiments herein. The following discussion refers to both FIGS. 7 and 8.

This example embodiment illustrates how the communication management resource 140 prevents the mobile communication device 121 from connecting to a neighbor's guest network (such as specified by SSID32) if the user is able to connect to their own private network (such as specified by SSID1) in subscriber domain 151.

As previously discussed, the wireless access points in network environment 100 monitor availability of other nearby wireless access points and provide notification of same to the communication management resource 140. The communication management resource 140 or other suitable entity stores the neighbor information 675 to control wireless access.

More specifically, assume in this example embodiment that the user 108 operates the mobile communication device 121 in close proximity (such as in subscriber domain 151 or outside of subscriber domain 151) to the wireless access point 131-1. In such an instance, if possible, it is desirable to wirelessly connect the mobile communication device 121 to the wireless access point 131-1 and corresponding network as specified by SSID1.

Assume that the user 108 (such as a subscriber paying fees for use of the wireless access point 131-1 in his/her subscriber domain 151) would like to establish a respective wireless communication link with any of one or more wireless access points 131 in order to connect to a remote network 190 such as the Internet, mobile network, etc. The mobile communication device 121 discovers presence of the guest network associated with the wireless access point 131-3 and assigned network name SSID32. In such an instance, the mobile communication device 121 transmits communications 810 over a respective wireless link to the wireless access point 131-3 to establish a respective wireless communication link with the wireless access point 131-3 via SSID32 (public network).

Note that the communications 810 can include any suitable information. For example, in one embodiment, the communications 810 indicate that the mobile communication device 121 would like to establish a respective wireless communication link with the wireless access point 131-3 via use of the guest network (public) network associated with the SSID32. In one embodiment, the communications 810 can include the identity of the guest network via inclusion of SSID32 in the request message associated with communications 810. Additionally, the communications 810 such as a wireless link request message include the unique identifier value XXY assigned to the mobile communication device 121.

As previously discussed, the unique identifier value XXY assigned to the mobile communication device 121 can be any suitable value. In one embodiment, the mobile communication device 121 includes configuration information 122 such as SIM information. The configuration information 122 includes a static, permanent, or non-changing unique identifier value (UIV) XXY assigned to the mobile communication device 121. In one nonlimiting example embodiment, the non-changing or permanent unique identifier value XXY is a so-called IMSI (International Mobile Subscriber Identity) value or other suitable value. In contrast to an assigned dynamic network address that may change over time, the nonchanging unique identifier value such as IMSI or phone number or other suitable value does not change over time and is therefore a reliable indicator of an identity of the mobile communication device 121.

In response to receiving the communications 810, the wireless access point 131-3 transmits communications 820 over network 190 to the communication management resource 140 such as authentication manager. The communication management resource 140 determines whether or not to provide the mobile communication device 121 access to the wireless access point 131-3 using the SSID32. In one embodiment, the communications 820 include information such as the unique network address ACCC (unique identifier value such as called station ID or MAC address) assigned to the wireless access point 131-3 and unique identifier value XXY assigned to the mobile communication device 121 requesting the wireless connectivity over the guest wireless network via SSID32.

In order to determine whether or not the wireless access point 131-3 should provide wireless connectivity to the mobile communication device 121 via the guest network based on SSID32, the communication management resource 140 transmits communications 830 to the account manager 151. In one embodiment, the communications 830 include the nonchanging unique identifier value XXY assigned to the mobile communication device 121. The account manager 151 performs a respective look up in the account information 191 to identify a respective account number assigned to the user 108 (such as subscriber associated with subscriber domain 151) operating the mobile communication device 121.

As previously discussed, FIG. 3 is an example diagram illustrating account information according to embodiments herein. As shown in FIG. 3, and corresponding account information 191, the unique identifier value XXY associated with the mobile communication device 121 maps to the account information 382212-14.

Referring again to FIGS. 7 and 8, in response to the account manager 151 mapping the unique identifier value XXY to the account value 382212-14, the account manager 151 transmits the response communications 840 including the account value 382212-14 to the communication management resource 140 as a response to the query communications 830.

As further shown, the communication management resource 140 then transmits communications 850 to the network manager 152. In one embodiment, the communications 250 include the obtained account information 382212-14 assigned to the subscriber domain 151, user 108, and/or mobile communication device 121.

The network manager 152 uses the account information 382212-14 associated with the mobile communication device 121 to determine a corresponding identity of each wireless access point operated in the subscriber domain 151 associated with the account information 382212-14. An example of the network information 192 is shown in FIG. 4. In this example embodiment, the network manager 152 maps the account information 382212-14 to the wireless access point identity information 411 (such as including unique network address ABCD1 and ABCD2 assigned to the wireless access points associated with the subscriber domain 151).

Referring again to FIG. 7, the network manager 152 transmits communications 860 to the communication management resource 140. The communications 860 include the wireless access point identity information 411 (such as network address ABCD1 and network address ABCD2).

The communication management resource 140 then compares the identity (such as network address ACCC) associated with wireless access point 131-3 received in the communications 820 to the wireless access point identity information 411 (ABCD1 and ABCD2) received from the network manager 152. Because the network address value ACCC as received from the wireless access point 131-3 is not equal to the wireless access point identity ABCD1 or ABCD2 received from the network manager 152, the communication management resource 140 determines if the mobile communication device 121 and/or wireless access point 131-1 or wireless access point 131-8 are in close proximity to the wireless access point 131-3. If so, the communication management resource 140 denies the mobile communication device 121 wireless access via wireless access point 131-3 because the wireless access point 131-1 at least provides the private network as indicated by SSID1 is nearby the mobile communication device 121.

More specifically, via communications 862 requesting neighbor information 675, and communications 864 responding with neighbor information 675, the communication management resource 140 obtains accesses neighbor information 675 to determine if the wireless access point 131-3 (network address ACCC) is in close proximity to the user's own wireless access point 131-1 (ABCD1) and/or wireless access point 131-8 (ABCD2). In this example embodiment, the communication management resource 140 detects that the wireless access point 131-3 (network address ACCC) is in close proximity to the wireless access point 131-1 (network address ABCD1) and wireless access point 131-8 (network address ABCD2) via the mapping of the network address ABCD1 or ABCD2 to network addresses ABBB, ACCC, and ADDD as indicated by the neighbor information 675 and prior discovery. For example, via the neighbor information 675, the communication management resource 140 either maps the network address ABCD1 to network address ACCC or maps the network address ACCC to the network address ABCD1. The mapping indicates that the wireless access point 131-3 assigned network address ACCC is close in proximity to the wireless access point 131-1 assigned network address ABCD1. The mapping also indicates that the wireless access point 131-3 assigned network address ACCC is close in proximity to the wireless access point 131-8 assigned network address ABCD2.

In response to detecting that the wireless access point 131-3 (network address ACCC) is near in proximity to the wireless access point 131-1 (network address ABCD) or wireless access point 131-8, via transmission of communications 870 to the wireless access point 131-3, the communication management resource 140 denies the wireless connectivity of the mobile communication device 121 to the wireless access point 131-3 via SSID32 (public or guest network associated with the service provider). As further discussed below, denial prevents the mobile communication device 121 from connecting to the public network SSID32.

Via further communications 880 transmitted from the wireless access point 131-3 to the mobile communication device 121, the wireless access point 131-3 notifies the mobile communication device 121 that the requested wireless service over the guest network via SSID32 has been denied. Thus, the communication management resource 140 communicates a control decision (via communications 870) to the wireless access point 131-3. In one embodiment, as previously discussed, the wireless service denial decision via communications 880 forces the mobile communication device 121 to attempt wireless connectivity to the wireless access point 131-1 or wireless access point 131-8 via the use of the private network SSID1.

Accordingly, embodiments herein include, in response to the communication management resource 140 detecting that the wireless access point 131-3 resides outside a subscriber domain 151 of the user 108, the communication management hardware 140 determines (such as makes an inquiry about) a nearness of the first wireless access point 131-3 to the wireless access point 131-1 or any wireless access point in subscriber domain 151. As previously discussed, the wireless access point 131-3 is disposed near the subscriber domain 151 of the user 108. The communication management hardware 140 then generates the control decision to deny the requested wireless communication link.

Thus, embodiments herein include determining and/or tracking nearness of one or more the wireless access points 131 with respect to each other in the network environment 100. The nearness of the wireless access points 131 with respect to each other can be determined in any suitable manner. For example, as previously discussed, embodiments herein include determining relative wireless signal strength of communications received at the wireless access points during discovery to determine if the wireless access points are near each other and viable substitutes to provide wireless connectivity.

More specifically, in one embodiment, the communication management resource 140 produces the control decision as indicated by the communications 880 to deny establishing the wireless communication link between the mobile communication device 121 and the wireless access point 131-3 in response to detecting that the wireless access point 131-3 is within wireless communication range of the wireless access point 131-1 or that wireless access point 131-1 is able to provide a good wireless connection to the mobile communication device 121. In such an embodiment, the communication management resource 140 communicates the control decision via communications 880 to the wireless access point 131-3, denying the wireless communication link. This prevents the mobile communication device 121 from connecting to the wireless access point 131-3.

In still further example embodiments, note that the communication management resource can be configured to produce the control decision in communications 880 to allow establishing the requested wireless communication link between the mobile communication device 121 and a corresponding wireless access point in response to detecting that a corresponding wireless access point to which the mobile communication device 121 is trying to wirelessly connect is not near the wireless access point 131-1. In this latter instance, the communication management resource communicates the control decision to the corresponding wireless access point that access is to be granted, enabling the wireless communication link. Thus, in cases where a respective wireless access point supporting the public or guest network is located far away with respect to wireless access point 131-1, and the mobile communication device 121 is trying to connect to that respective wireless access point, the requesting mobile communication device 121 is provided wireless service to that respective wireless access point when the mobile communication device 121 is not within wireless range of the subscriber domain 151 and/or corresponding wireless access point 131-1 and wireless access point 131-8.

Figure 9:
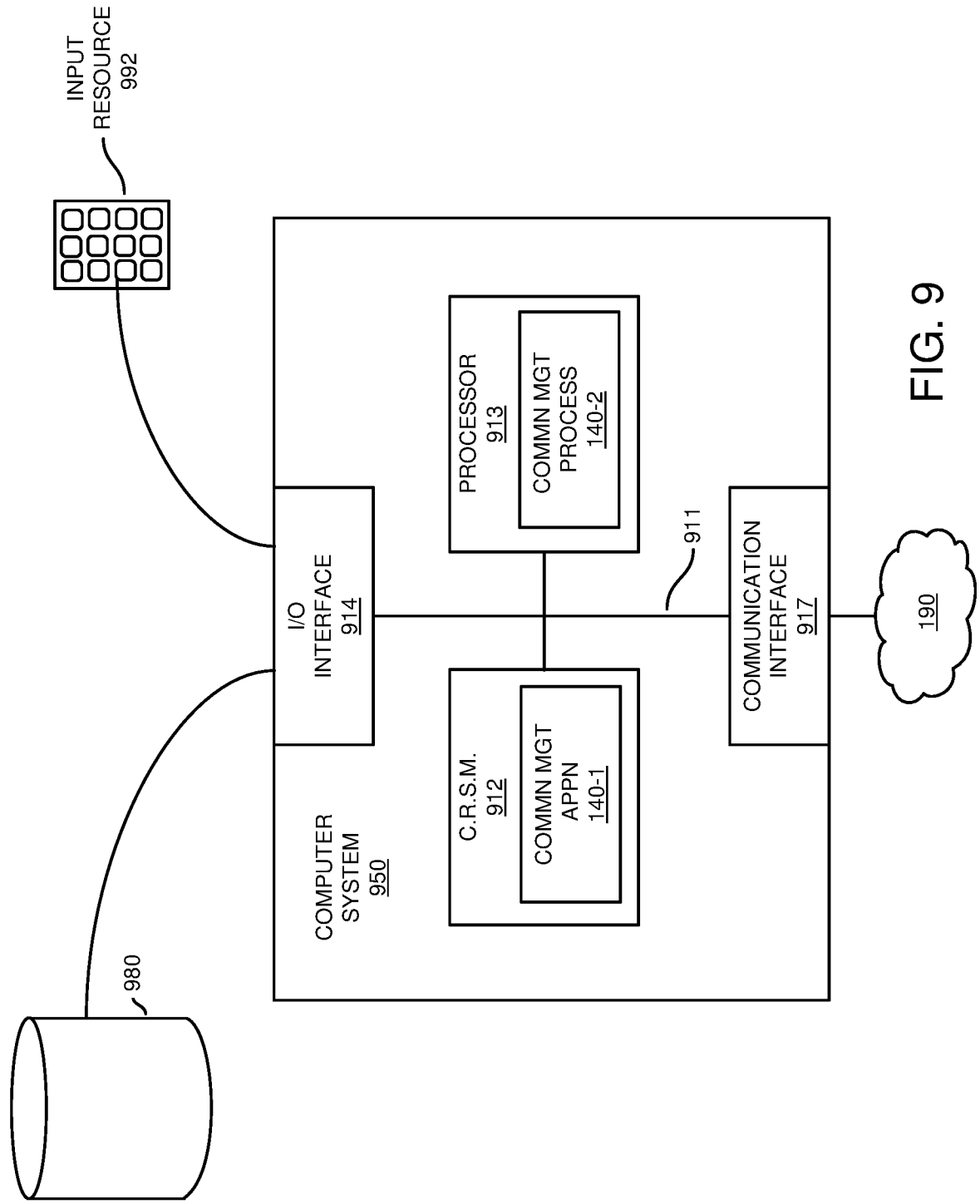
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as mobile communication devices, wireless access points, wireless stations, wireless base stations, communication management resource, bandwidth management resource, network management, account manager, etc.) as discussed herein can be configured to include computer processor hardware and/or corresponding executable instructions to carry out the different operations as discussed herein.

As shown, computer system 950 of the present example includes an interconnect 911 that coupling computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in communication management application 140-1 stored on computer readable storage medium 912. Execution of the communication management application 140-1 produces communication management process 140-2 to carry out any of the operations and/or processes as discussed herein.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
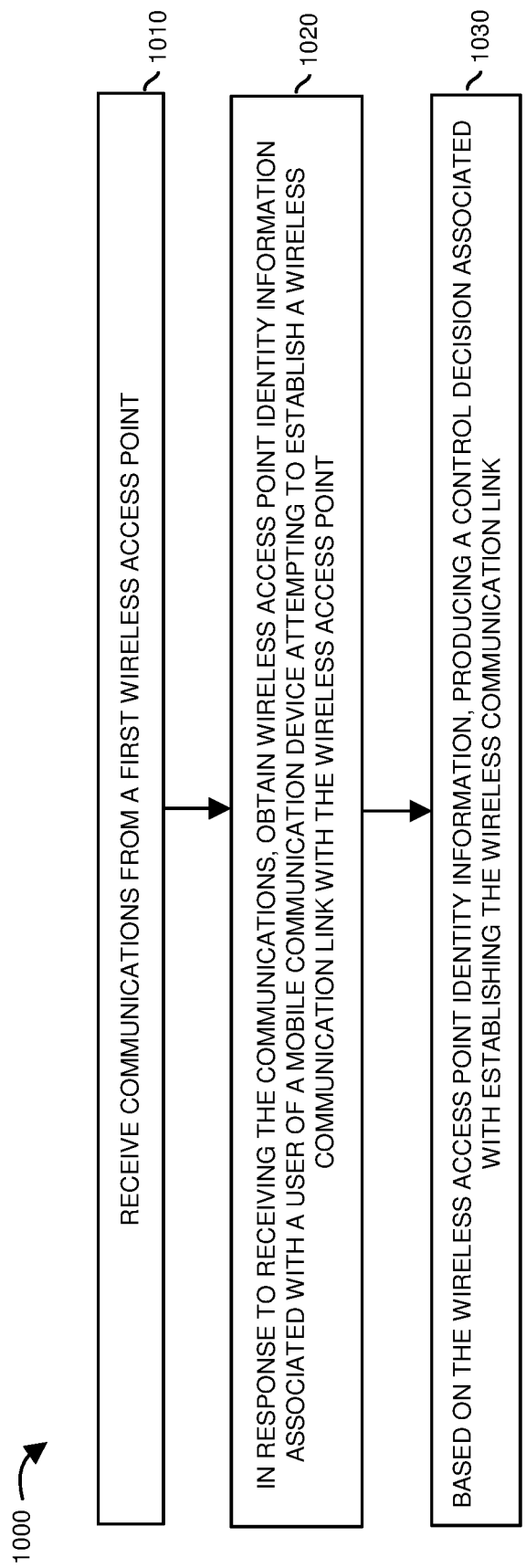
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the communication management resource 140 receives communications from a first wireless access point.

In processing operation 1020, in response to receiving the communications, the communication management resource obtains wireless access point identity information associated with a user of a mobile communication device attempting to establish a wireless communication link with the wireless access point.

In processing operation 1030, based on the wireless access point identity information, the communication management resource produces a control decision associated with establishing the wireless communication link.

Note again that techniques herein are well suited to facilitate forcing connectivity of a respective mobile communication device to a corresponding subscriber's wireless access point if possible. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving communications from a first wireless access point supporting a guest wireless network and a private wireless network, the guest wireless network providing wireless access to non-subscribers, the private wireless network providing wireless access to subscribers, the communications indicating an identity of the first wireless access point and an attempt by a user of a mobile communication device to establish a wireless communication link with the first wireless access point via the quest wireless network, the user being a subscriber to the private wireless network;
in response to receiving the communications, obtaining wireless access point identity information associated with the user of the mobile communication device attempting to establish the wireless communication link with the first wireless access point; and
based on the wireless access point identity information, producing a control decision associated with establishing the wireless communication link.

2. The method as in claim 1 further comprising:
communicating the control decision to the first wireless access point, the first wireless access point controlling establishment of the wireless communication link between the first wireless access point and the mobile communication device in accordance with the control decision.

3. The method as in claim 1, wherein the wireless access point identity information indicates the identity of the first wireless access point, the first wireless access point disposed in a subscriber domain of the user.

4. The method as in claim 1 further comprising:
obtaining the wireless access point identity information via mapping of a unique identifier value assigned to the mobile communication device to the wireless access point identity information.

5. The method as in claim 1 further comprising:
via the communications received from the first wireless access point, retrieving a unique identifier value assigned to the first wireless access point, the unique identifier value indicating the identity the of the first wireless access point;
comparing the retrieved unique identifier value to the wireless access point identity information;
producing the control decision based on the comparison; and
communicating the control decision to the first wireless access point.

6. The method as in claim 5 further comprising:
producing the control decision to deny establishing the wireless communication link in response to detecting that the retrieved unique identifier value assigned to the first wireless access point is included in the wireless access point identity information.

7. The method as in claim 1 further comprising:
obtaining the wireless access point identity information associated with the user of the mobile communication device based on a unique identifier value associated with the mobile communication device, the unique identifier value stored in a SIM (Subscriber Identity Module) card of the mobile communication device.

8. The method as in claim 1, wherein obtaining the wireless access point identity information associated with the user of the mobile communication device includes:

from the received communications, retrieving a unique identifier value assigned to the mobile communication device; and in response to communicating the unique identifier value to a first communication management entity, receiving an account identifier value assigned to the user of the mobile communication device.

9. The method as in claim 8, wherein obtaining the wireless access point identity information associated with the user of the mobile communication device further includes:

in response to communicating the account identifier value to a second communication management entity, receiving the wireless access point identity information assigned to the user of the mobile communication device.

10. The method as in claim 1 further comprising:

in response to detecting that the first wireless access point resides outside a subscriber domain of the user, determining a nearness of the first wireless access point to a second wireless access point, the second wireless access point disposed in the subscriber domain of the user.

11. The method as in claim 10 further comprising:

producing the control decision to deny establishing the wireless communication link between the mobile communication device and the first wireless access point in response to detecting that the first wireless access point is within a vicinity of the second wireless access point; and communicating the control decision to the first wireless access point.

12. The method as in claim 10 further comprising:

producing the control decision to allow establishing the wireless communication link between the mobile communication device and the first wireless access point in response to detecting that the first wireless access point is not within a vicinity of the second wireless access point; and communicating the control decision to the first wireless access point.

13. The method as in claim 1, wherein the control decision indicates to deny establishing the wireless communication link based on the wireless access point identity information indicating the identity of the first wireless access point.

14. The method as in claim 1, wherein the control decision indicates to deny establishing the wireless communication link in response to the wireless access point identity information indicating that the first wireless access point is assigned for use by the mobile communication device.

15. The method as in claim 1, wherein the control decision indicates to deny establishing the wireless communication link in response to the wireless access point identity information indicating that the first wireless access point is assigned for use by the mobile communication device, the first wireless access point assigned for use by the mobile communication device based on the user subscribing to a network including the first wireless access point.

16. The method as in claim 1, wherein the control decision indicates to deny establishing the wireless communication link via the guest wireless network in response to detecting that the private wireless network supported by the first wireless access point is configured to provide the mobile communication device access to a remote network through the first wireless access point.

17. The method as in claim 16, wherein the control decision denying the establishment of the wireless communication link via the guest wireless network causes the mobile communication device to establish wireless connectivity with the first wireless access point via the private wireless network.

18. The method as in claim 1, wherein the wireless access point identity information indicates an identity of one wireless access point assigned to provide wireless connectivity of the mobile communication device to a remote network.

19. The method as in claim 1, wherein the wireless access point identity information indicates identities of multiple wireless access points assigned to provide wireless connectivity of the mobile communication device to a remote network.

20. The method as in claim 1, wherein the wireless access point identity information indicates an identity of a second wireless access point for use by the user to connect with a remote network as an alternative to the first wireless access point.

21. The method as in claim 20, wherein the second wireless access point resides in a subscriber domain associated with the user; and wherein the first wireless access point resides outside the subscriber domain associated with the user.

22. A system comprising:

communication management hardware operative to:

receive communications from a first wireless access point supporting a guest wireless network and a private wireless network, the guest wireless network providing wireless access to non-subscribers, the private wireless network providing wireless access to subscribers, the communications indicating an identity of the first wireless access point and an attempt by a user of a mobile communication device to establish a wireless communication link with the first wireless access point via the quest wireless network, the user being a subscriber to the private wireless network;

in response to receiving the communications, obtain wireless access point identity information associated with the user of the mobile communication device attempting to establish the wireless communication link with the first wireless access point; and based on the wireless access point identity information, produce a control decision associated with establishing the wireless communication link.

23. The system as in claim 22, wherein the communication management hardware is further operative to:

communicate the control decision to the first wireless access point, the first wireless access point controlling establishment of the wireless communication link between the first wireless access point and the mobile communication device in accordance with the control decision.

24. The system as in claim 22, wherein the wireless access point identity information indicates an identity of the first wireless access point, the first wireless access point disposed in a subscriber domain of the user.

25. The system as in claim 22, wherein the communication management hardware is further operative to:

obtain the wireless access point identity information via mapping of a unique identifier value assigned to the mobile communication device to the wireless access point identity information.

26. The system as in claim 22, wherein the communication management hardware is further operative to:

from the communications received from the first wireless access point, retrieve a unique identifier value assigned to the first wireless access point, the unique identifier value indicating the identity of the wireless access point;

compare the retrieved unique identifier value to the wireless access point identity information;

produce the control decision based on the comparison; and communicate the control decision to the first wireless access point.

27. The system as in claim 26, wherein the communication management hardware is further operative to:

produce the control decision to deny establishing the wireless communication link in response to detecting that the retrieved unique identifier value assigned to the first wireless access point is included in the wireless access point identity information.

28. The system as in claim 22, wherein the communication management hardware is further operative to:

obtain the wireless access point identity information via a unique identifier value associated with the mobile communication device, the unique identifier value stored in a SIM (Subscriber Identity Module) card of the mobile communication device.

29. The system as in claim 22, wherein the communication management hardware is further operative to:

from the received communications, retrieve a unique identifier value assigned to the mobile communication device; and in response to communicating the unique identifier value to a first communication management entity, receive an account identifier value assigned to the user of the mobile communication device.

30. The system as in claim 29, wherein the communication management hardware is further operative to:

in response to communicating the account identifier value to a second communication management entity, receive the wireless access point identity information assigned to the user of the mobile communication device.

31. The system as in claim 22, wherein the communication management hardware is further operative to:

in response to detecting that the first wireless access point resides outside a subscriber domain of the user, determine a nearness of the first wireless access point to a second wireless access point, the second wireless access point disposed in the subscriber domain of the user.

32. The system as in claim 22, wherein the communication management hardware is further operative to:

produce the control decision to deny establishing the wireless communication link between the mobile communication device and the first wireless access point in response to detecting that the first wireless access point is within a vicinity of a second wireless access point; and communicate the control decision to the first wireless access point.

33. The system as in claim 31, wherein the communication management hardware is further operative to:

produce the control decision to allow establishing the wireless communication link between the mobile communication device and the first wireless access point in response to detecting that the first wireless access point is not within a vicinity of the second wireless access point; and communicate the control decision to the first wireless access point.

34. Computer-readable storage hardware having instructions stored thereon, the instructions, when carried out by computer processor hardware, cause the computer processor hardware to:

receive communications from a first wireless access point supporting a guest wireless network and a private wireless network, the quest wireless network providing wireless access to non-subscribers, the private wireless network providing wireless access to subscribers, the communications indicating an identity of the quest wireless network and an attempt by a user of a mobile communication device to establish a wireless communication link with the first wireless access point via the quest wireless network, the user being a subscriber to the private wireless network;

in response to receiving the communications, obtain wireless access point identity information associated with the user of the mobile communication device attempting to establish the wireless communication link with the first wireless access point; and based on the wireless access point identity information, produce a control decision associated with establishing the wireless communication link.

\* \* \* \* \*

UNITED STATES PATENT AND TRADEMARK OFFICE
CERTIFICATE OF CORRECTION

PATENT NO. : 12,445,854 B2  
APPLICATION NO. : 17/529524  
DATED : October 14, 2025  
INVENTOR(S) : Shane B. Newberg and Christopher J. Teague Page 1 of 1

It is certified that error appears in the above-identified patent and that said Letters Patent is hereby corrected as shown below:

In the Claims

Claim 1, Line 11, replace "quest" with --guest--
Claim 22, Line 12, replace "quest" with --guest--
Claim 34, Line 7, replace "quest" with --guest--
Claim 34, Line 10, replace "quest" with --guest--
Claim 34, Line 14, replace "quest" with --guest--

Signed and Sealed this  
Sixteenth Day of December, 2025

John A. Squires  
*Director of the United States Patent and Trademark Office*